July 7, 1936.   R. L. CARR   2,046,725
VEHICLE BODY
Filed May 11, 1933   7 Sheets-Sheet 1
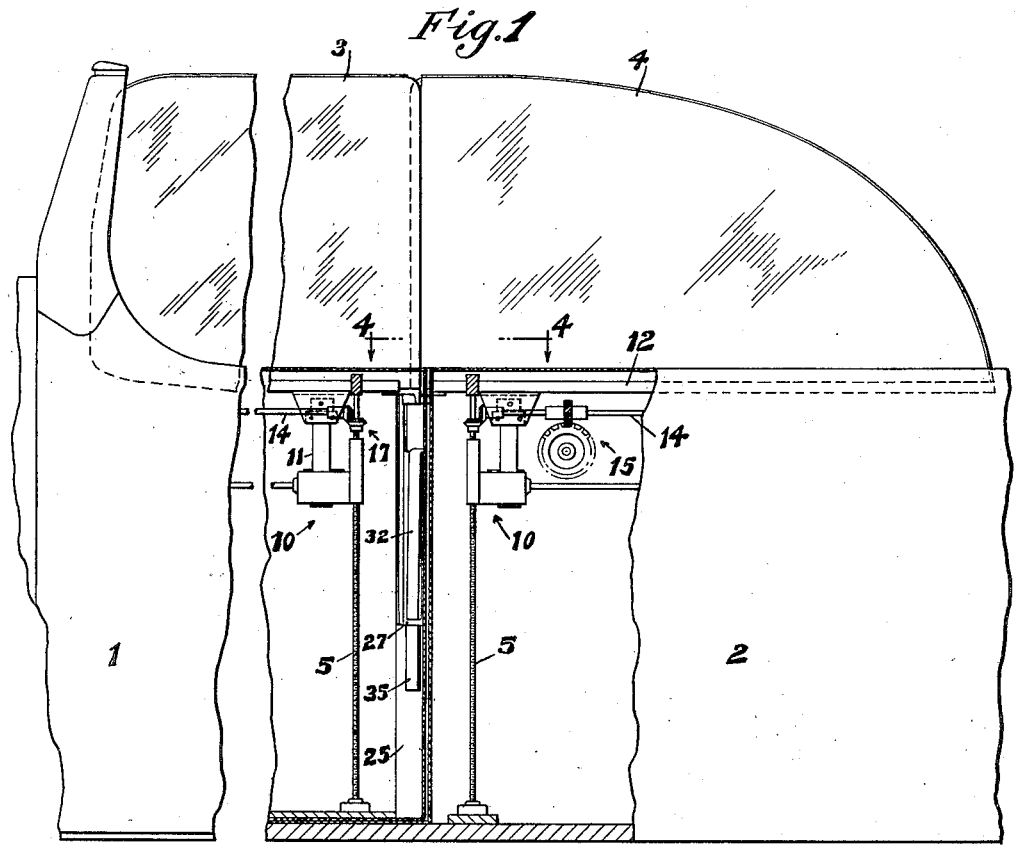
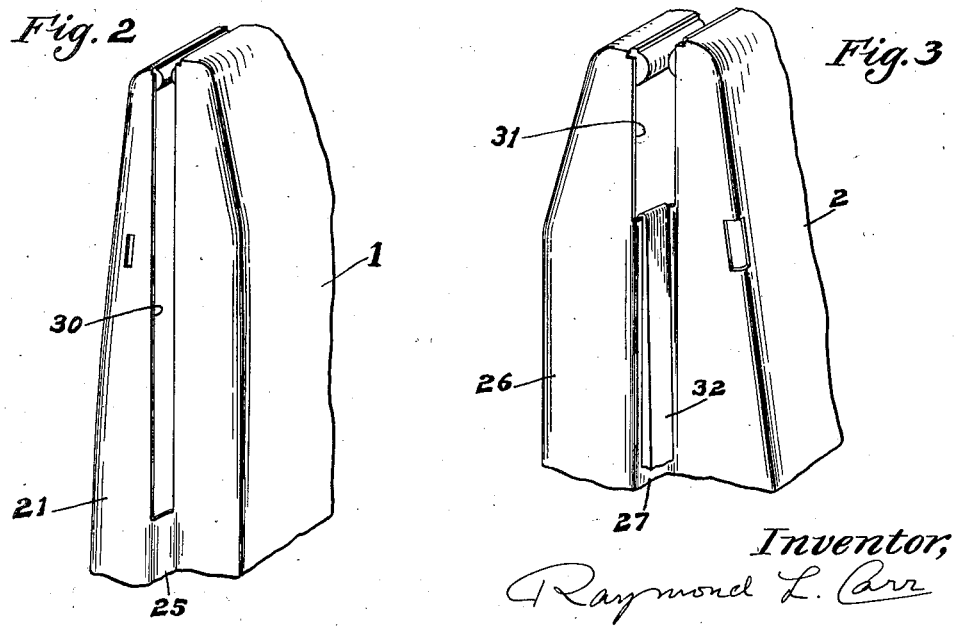
Inventor,
Raymond L. Carr

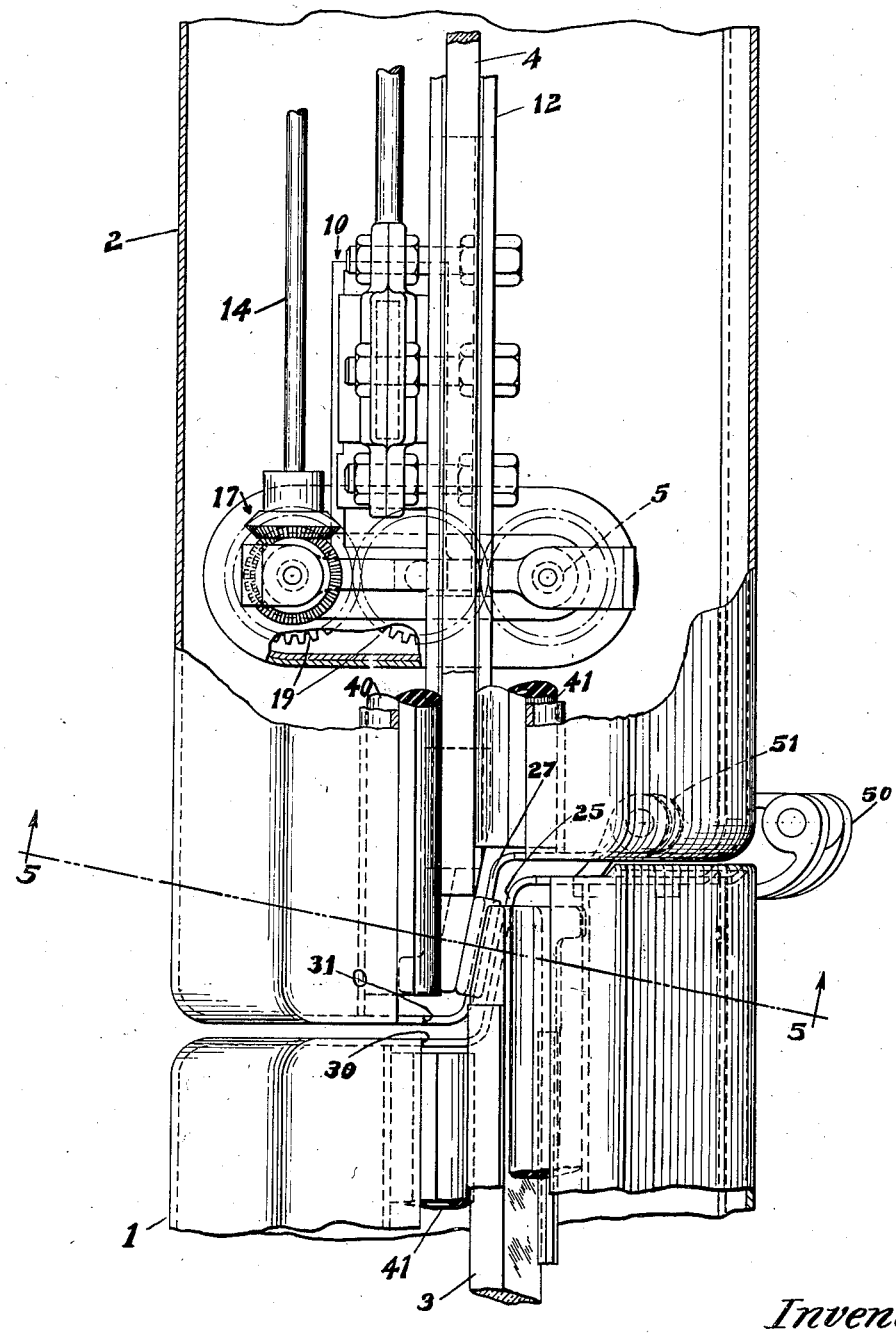

July 7, 1936.  R. L. CARR  2,046,725
VEHICLE BODY
Filed May 11, 1933  7 Sheets-Sheet 3
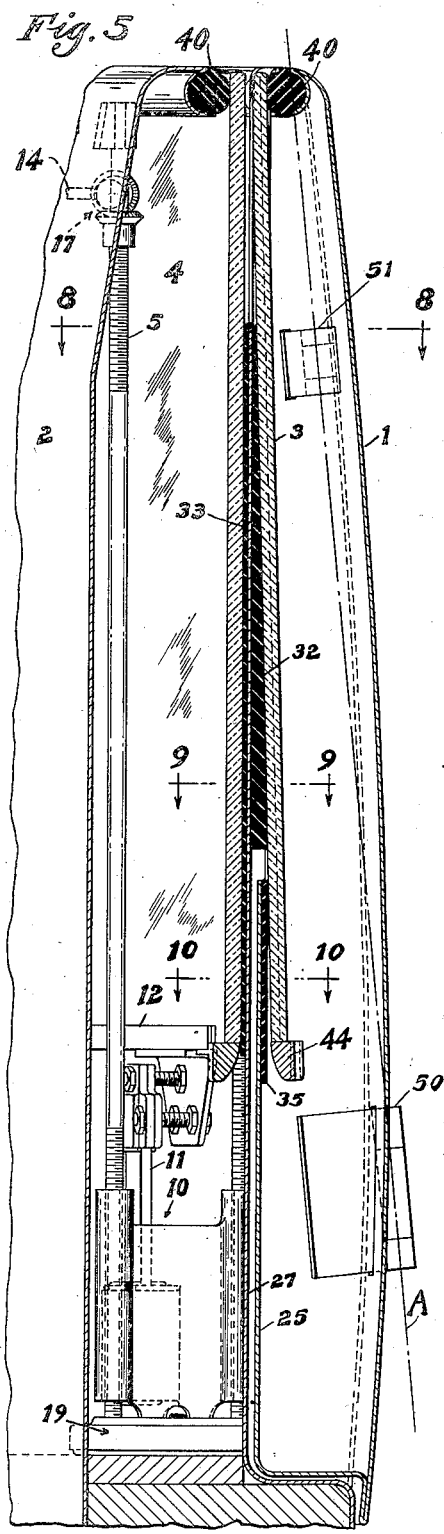
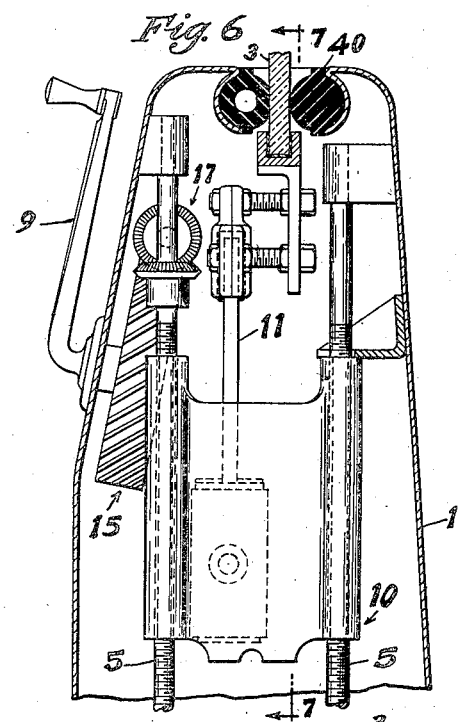
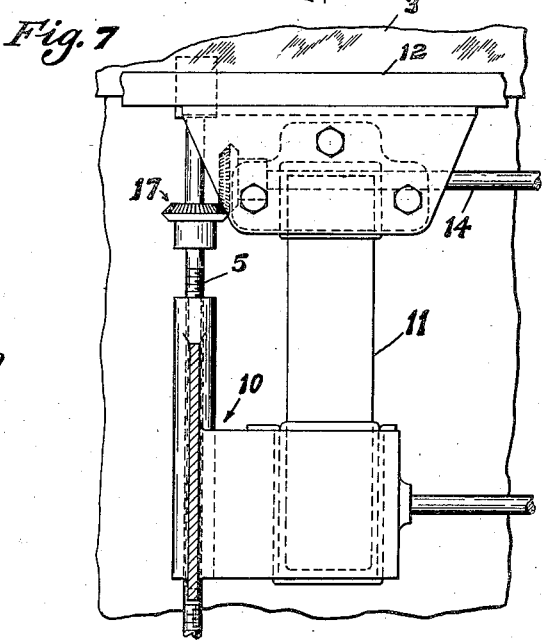
Inventor,
Raymond L. Carr July 7, 1936.   R. L. CARR   2,046,725
VEHICLE BODY
Filed May 11, 1933   7 Sheets-Sheet 4

Inventor,
Raymond L. Carr

July 7, 1936.  R. L. CARR  2,046,725
VEHICLE BODY
Filed May 11, 1933  7 Sheets—Sheet 5
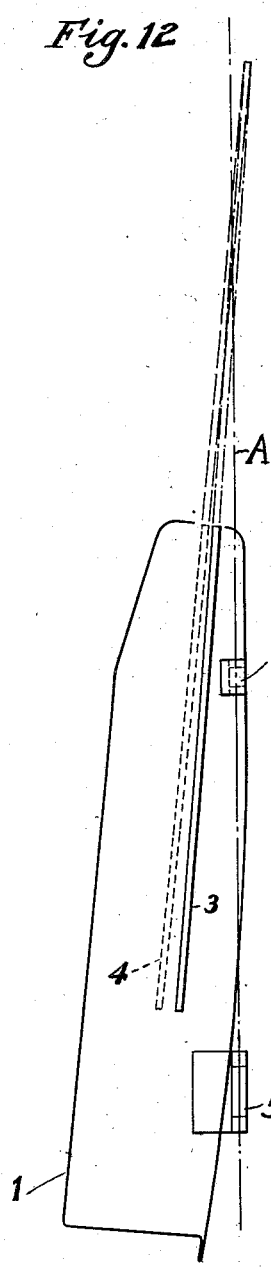
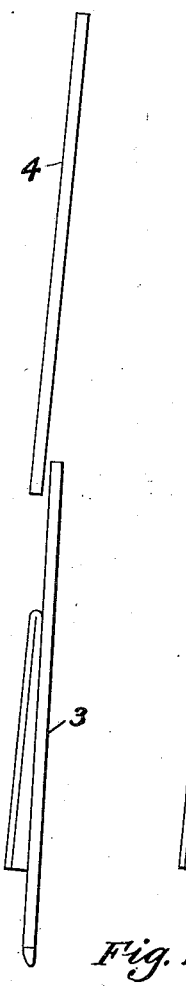
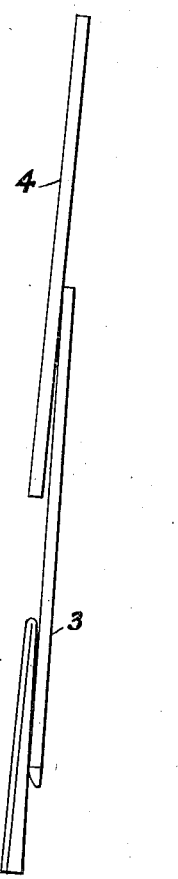
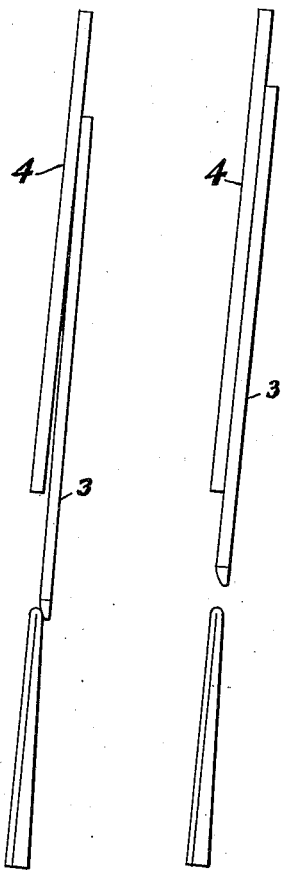
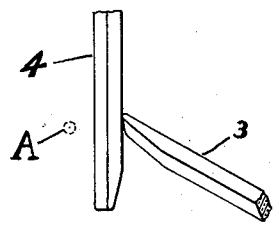
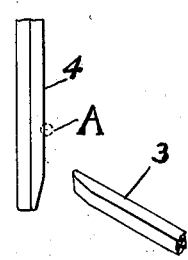
Inventor,
Raymond L. Carr July 7, 1936.      R. L. CARR      2,046,725
VEHICLE BODY
Filed May 11, 1933      7 Sheets-Sheet 6
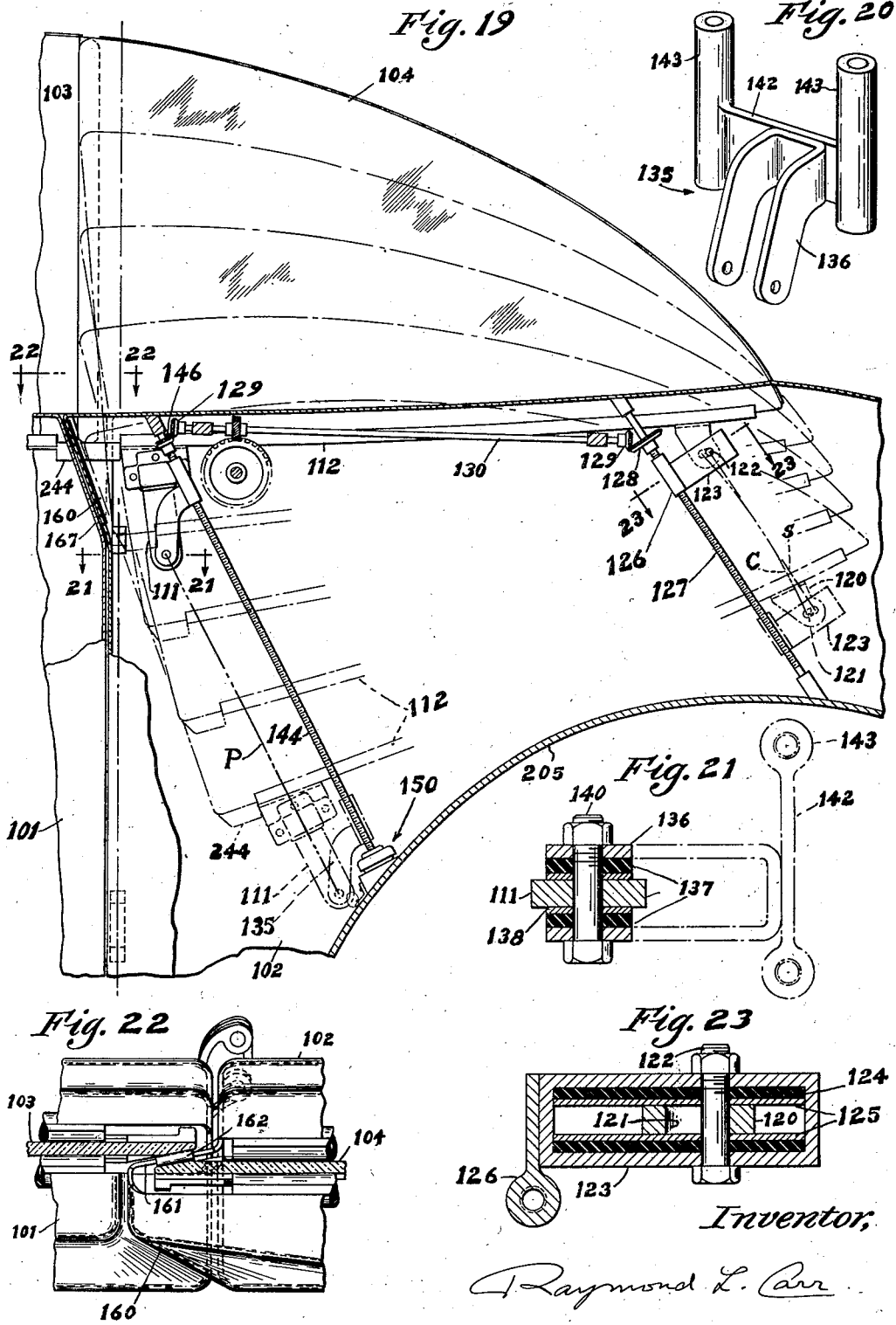

July 7, 1936. R. L. CARR 2,046,725
VEHICLE BODY
Filed May 11, 1933 7 Sheets-Sheet 7
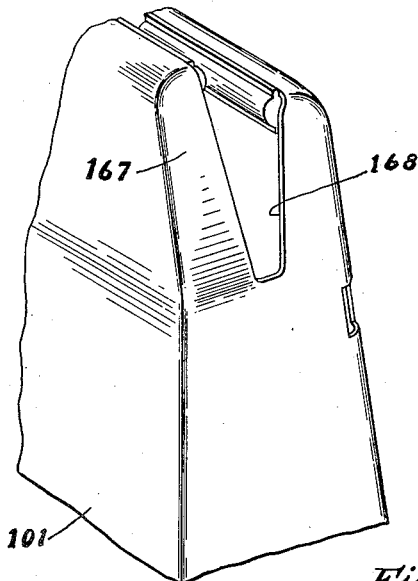
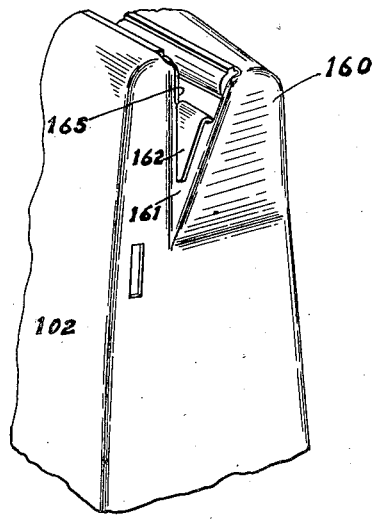
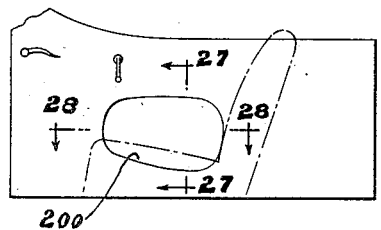
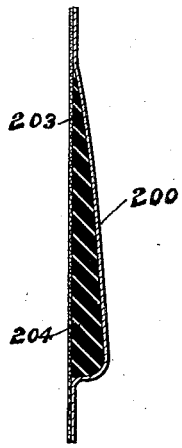
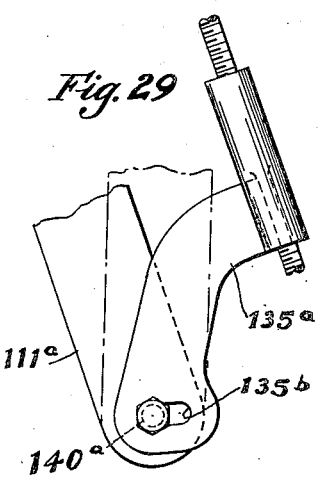
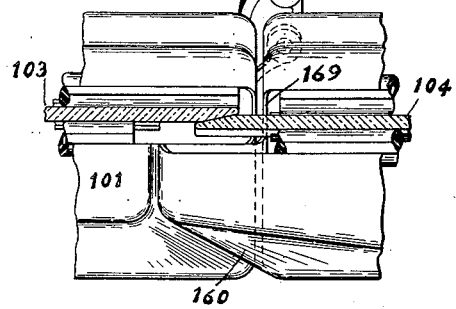
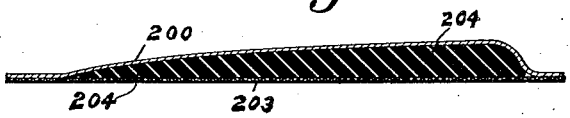
Inventor,
Raymond L. Carr Patented July 7, 1936

2,046,725

UNITED STATES PATENT OFFICE 2,046,725

VEHICLE BODY

Raymond L. Carr, Boston, Mass.

Application May 11, 1933, Serial No. 670,487

26 Claims. (Cl. 296—45)

This invention relates to improvements in vehicle bodies, and particularly to closure wall and panel arrangements. In general the present invention provides improved arrangements of the general type disclosed in my prior Patents Nos. 1,826,865 and 1,826,922, both of which show vehicle bodies with panels movable upwardly out of adjoining body wall sections into direct juxtaposition preferably to provide a substantially continuous transparent closure wall. In accordance with the disclosures of these patents, panels are moved upwardly along paths which are generally parallel to each other, but with one or both of the paths having a substantially longitudinal component at its upper end effective to bring the panels together. My application Serial No. 371,162, filed June 15, 1929, discloses an optional panel arrangement wherein the panels move upwardly along substantially straight vertical paths with their edges remaining in direct engagement. However, the latter arrangement involves the disadvantage of necessitating relatively deep slots at the ends of the adjoining body wall sections which tend materially to weaken this portion of the body wall structure. My prior application Serial No. 654,995, filed February 2, 1933, discloses an improved hinge arrangement which is particularly applicable to a panel assembly of this general character, and especially to a closure wall having adjoining panels with glass edges in contacting relationship.

The present invention affords an improved arrangement permitting the panels to move upwardly along differently directed paths, as desired, for example, either along substantially straight, nearly parallel paths, or along paths which converge at their upper ends, and particularly permits the advantageous movement and contacting relationship of the panels without necessitating the provision of deep slots in the ends of both of the adjoining body wall sections. In fact, in one embodiment of this invention only the upper parts of the adjoining body wall sections need be broken away so that an unusually sturdy structure may be afforded.

My prior Patent No. 1,826,922 discloses a rear panel arrangement wherein the panel follows a generally curved path, this path having a component directed toward the adjoining panel so that the panels move into engagement during the upper parts of their paths. This invention affords a panel movable in this same general manner and following a generally inclined or curved path but with the improved lifting and manipulating means to direct the panel along its path.

Such an arrangement is advantageous in permitting the panel to be received above the wheel housing so that the panel may be fully lowered or moved into a substantially concealed position and yet a relatively wide seat may be provided between adjoining wheel housings.

My prior application Serial No. 654,995 discloses a panel supporting arrangement whereby the edges of the panels are maintained in contact throughout their generally vertical paths, except when the door opens. The present invention permits the panels, when at or near their lowered positions, to contact an intervening member which may be a part of or be carried by the end wall of one of the body wall sections, the supporting means for the panels pressing the same against opposite faces of this member in such a manner that their paths gradually converge as they move toward their fully raised positions. Since the panels are both being held against a common interposed member, there is little or no relative movement therebetween, despite body wall twisting or weaving. Consequently rattling is obviated. This arrangement is also advantageous since it assures the panels normally remaining out of engagement with each other until at least one of the panels has approached its uppermost position, wherein the novel hinge means, such as disclosed in my prior application Serial No. 654,995, permits the panels to remain in engagement or close juxtaposition even when the door is opened. When the panels are near their lowered position, the present invention permits them to remain out of contact even when the door is closed. Thus an unusually effective means is provided to protect the edges of glass panels even when the door is slammed.

The above and further objects and advantageous features of the invention will be apparent to those skilled in the art upon a reading of the subjoined description and claims in conjunction with the accompanying drawings, in which:

Fig. 1 is a broken side elevation of the side of a vehicle body showing advantageous features of my invention applied thereto, the outer face of the body wall being broken away to disclose a portion of the lifting and guiding mechanism;

Fig. 2 is an isometric view of the rear end portion of the door section of the body wall shown in Fig. 1;

Fig. 3 is an isometric view of the upper front corner of the rear or fixed body wall section shown in Fig. 1;

Fig. 4 is a section on line 4—4 of Fig. 1, but with a portion of the upper part of the rear section broken away and with the panels in their lowered positions;

Fig. 5 is a section on line 5—5 of Fig. 4;

Fig. 6 is a transverse section of the door shown in Fig. 1;

Fig. 7 is a section on line 7—7 of Fig. 6;

Figure 8:
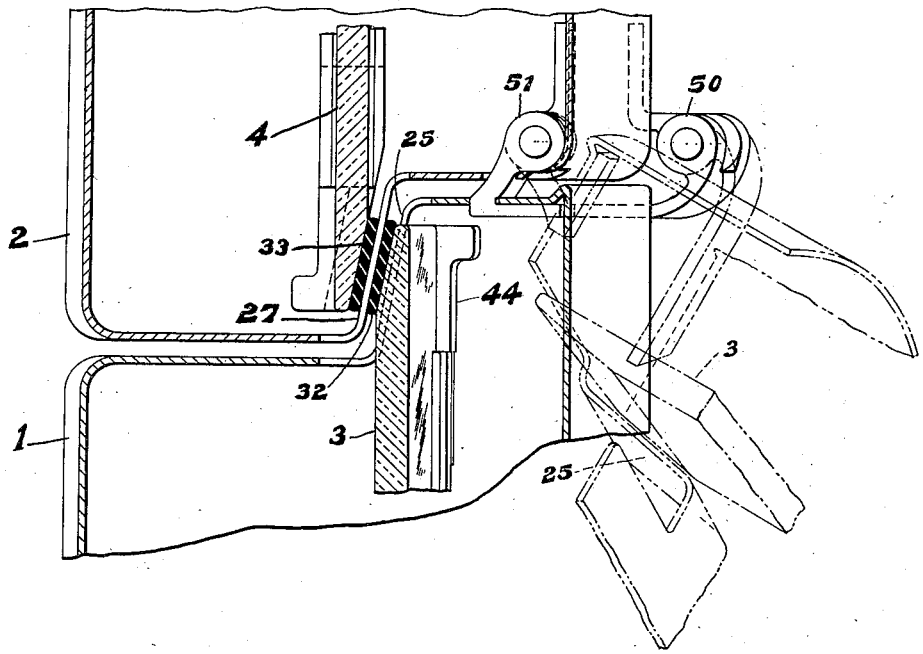
Figure 9:
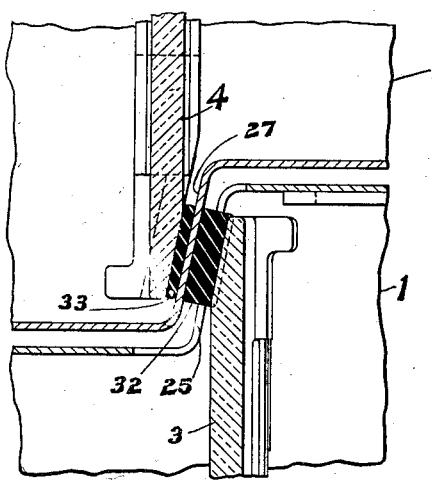
Figure 10:
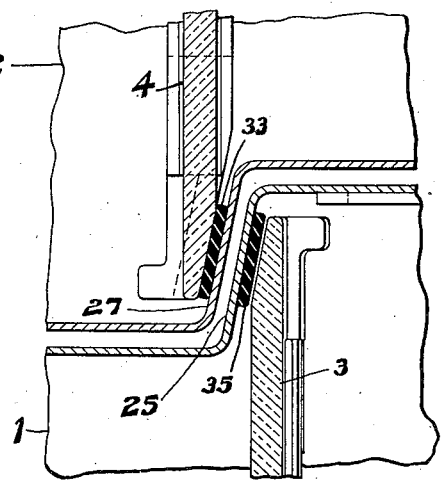
Figure 11:
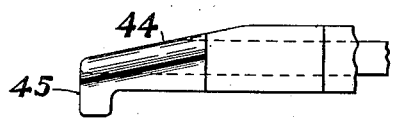

Figs. 8, 9 and 10 are sections indicated by lines 8—8, 9—9 and 10—10, respectively, of Fig. 5; Fig. 8 also showing in dotted lines the position of a fragmentary portion of the door when it has been swung to its open position;

Fig. 11 is a bottom view of the end of one of the panels shown in the preceding figures;

Fig. 12 is a diagrammatic view showing the general relationship of the panel paths to the door and the hinge axis therefor;

Figs. 13, 14, 15 and 16 are diagrammatic views showing the relative positions of the panel ends under various conditions;

Figs. 17 and 18 are diagrammatic views showing the relative positions of the panels when raised and substantially half raised, respectively, and when the door is opened;

Fig. 19 is a side elevation of the rear portion of a body wall, showing an optional form of the invention, with the outer face of the wall removed and showing various positions of the rear panel in dot and dash lines;

Fig. 20 is an isometric view of a bracket employed in the assembly illustrated in Fig. 19;

Figs. 21, 22 and 23 are sections indicated by lines 21—21, 22—22, and 23—23, respectively, of Fig. 19;

Fig. 24 is an isometric view of the upper rear corner of the door shown in Fig. 19;

Fig. 25 is an isometric view of the upper front corner of the rear body wall section shown in Fig. 19;

Fig. 26 is a diagrammatic view of the inside of the vehicle door, the position of the seat being indicated by dot and dash lines;

Figs. 27 and 28 are sections on lines 27—27 and 28—28, respectively, of Fig. 26;

Fig. 29 is an elevational detail of an optional bracket assembly; and

Fig. 30 is a view similar to Fig. 22, but illustrating an optional development of the invention.

Fig. 1 of the accompanying drawings illustrates a typical body wall in which features of my invention may be incorporated, this wall comprising a front section 1 in the form of a swinging door and a rear fixed section 2, panels 3 and 4 being mounted upon the respective sections and movable out of pockets in the same. Any suitable lifting, guiding and supporting means may be disposed within the pockets to determine the general direction of the paths of the panels, to position them in desired adjusted positions, and to ensure the proper maintenance of their adjoining edges in suitable relationship.

As shown in Figs. 1, 4, 6 and 7, a plurality of upright worms or screw-threaded rods 5 may be arranged at the ends of the body wall sections and may carry brackets, designated in general by numeral 10, supporting the lower ends of upstanding leaf springs 11, the upper ends of which are adjustably connected to the frames 12 of the panels 3 and 4. Hand cranks 9 may be employed to cause rotation of the worms 5. For this purpose a horizontal shaft 14 may be provided in each section, being driven by suitable gearing 15 connected to the crank and having beveled gear connections 17 at its ends with the worms. If desired, when two worms are arranged in side by side relation, as shown in Fig. 4, the lower ends of the worms may be operatively connected to each other by suitable spur gears 19 (Fig. 4). Lifting and supporting means of this character is of the same general type as that disclosed in my co-pending application Serial No. 654,995 and is effective in permitting the desired vertical adjustment of the panels and in permitting the panel edges to be yieldably pressed together due particularly to the action of the springs 11 when the panels are fully raised and their edges in direct contact.

In accordance with this invention, as shown in Figs. 2 and 4, the rear portion of the door 1 may be rabbeted to provide an outer portion which extends rearwardly somewhat further than the remainder of the door; the rearwardly extending part 21 thus provided has a generally longitudinally disposed but somewhat laterally inclined inner wall section 25. The front end of the rear section 2 of the body wall has a form substantially complementary to that of the rear end of the door 1, as shown in Figs. 3 and 4. Thus this end of section 2 is rabbeted but provided with an inner portion 26 which extends forwardly of the remainder of the section, a suitably laterally inclined wall 27 being disposed in parallel juxtaposition to the wall 25. Preferably, as shown, one of the laterally inclined walls of the rabbeted ends of these sections is provided with a relatively deep slot, while the other is provided with a relatively shallow slot. Thus, as shown in Fig. 2, wall 25 of the door may be cut away to afford a relatively deep slot 30 while a similar shallow slot 31 may be afforded in the corresponding wall 27 of the rear section.

The portion 27 of the rear section is of particular significance in so far as the principles of this invention are concerned and may be conveniently provided with rubber covering in the form of an outer wedge-shaped element 32 (see Fig. 5) and an inner covering of substantially uniform thickness 33. The elements 32 and 33 may be integrally connected at their upper ends, i. e., at the bottom of the slot 31. If desired, the inner surface of the wall portion 25 of the door may be provided with a rubber covering 35 (Fig. 5).

The panel supporting and guiding means, and particularly the worms 5, preferably are arranged in such a relation to each other that the normal path of the panel 3 is slightly inclined (transversely of the vehicle wall) in relation to that of the panel 4; for example, this inclination may be of the order of the angle of inclination of the outer surface of element 32. The springs 11 supporting the rear section and front section, respectively, tend, when the panels are in their lowered positions, illustrated in Fig. 5, to hold the panels against the opposite rubber elements 32 and 33, which are firmly secured to the wall portion 27. Thus in effect this wall portion and its rubber covering elements afford a single common or intervening unit against which the opposed panel edges press. Accordingly when there is relative movement between the end of the door and the adjoining section, the door panel will tend to be held in substantially the same position in engagement with the element 32 despite movement of the door itself.

At the upper edges of the body wall sections, i. e., along the body rail, I provide suitable rubber elements 40 and 41 which aid in holding the panels in proper position.

Obviously as the panels move upwardly their paths approach each other, Figs. 13 to 16, inclusive, diagrammatically illustrating the relationship of the panels under these conditions.

In these figures the panel 4 is shown in its raised or uppermost position, it being understood that this panel follows a path substantially parallel to the adjoining surface of the intervening unit afforded by the wall 27 and rubber covering pieces 32 and 33.

When the panel 4 is raised or, in fact, occupies any portion of its path and the panel 3 is lowered, there is a space between the upper corner of the panel 3 and the adjoining surface of panel 4 (Figs. 5 and 13). As the panel 3 moves upwardly it leaves its position in engagement with the rubber element 35 on the door and bears entirely on the rubber element 32, and, continuing upon its path, its upper corner contacts the panel 4, if the latter is fully raised or is substantially above an intermediate position (Fig. 14). Upon continued movement of the panel 3 its lower portion continues to engage the rubber element 32, while its upper portion engages the panel 4, as shown in Fig. 15. Near the upper end of its path the panel 3 moves over the bottom of the slot 31, so that its edge moves into substantially parallel face to face contact with the beveled edge of the adjoining panel. Thus when the panels are both near their uppermost or fully raised positions, they are in direct face to face contact. During certain intermediate positions there will be a slight relative inclination between the panels, as shown in Figs. 14 and 15, thus affording a narrow tapered clearance space between their edges. Obviously when the panels are fully lowered, as shown in Fig. 5, they are pressed in engagement with the common intervening unit provided by the wall 27 and rubber pieces 32 and 33. Under these conditions the lower portion of panel 3 may lightly contact the upper portion of the rubber element 35, the length of the bearing surface on element 32 engaging the panel, being such, however, that there is little possibility of rattling, even under extreme conditions of body weaving or twisting. In this position of the parts the element 40 also presses inwardly along the upper edge of the panel 3.

As the panel 3 leaves this position, its upper corner approaches the path of panel 4 and its lower portion may leave the element 35 so that the edge of the panel 3 is being pressed only on the element 32. Under these conditions the panels 3 and 4 are both being yieldably pressed against the common interposed separating unit so that, despite some relative movement between the body wall sections, the panels are maintained in substantially fixed relation to each other so that there is only negligible movement between the panel edges and there is litttle tendency toward rattling, even when the panel edges are but very slightly spaced or are only in light contact.

When the panel 4 remains fully lowered, the panel 3 may obviously continue upwardly and will not contact the panel 4 until its lower portion passes over the bottom of the slot 31; then the lower portion of the end of panel 3 will contact the adjoining portion of the lowered panel 4 in face to face relationship. When the panels occupy a relative position of the type shown in Fig. 14, the lower portion of panel 3 is being yieldably pressed against the interposed unit, while the upper corner thereof is being yieldably held against panel 4. In such a position of the parts the lower part of panel 3 tends to be slightly inclined in relation to the adjoining surface of the interposed unit so that there is, in effect, a substantially two-point contact of this panel so that its yieldable supporting means may permit it to remain in yieldable contact with the interposed unit and with the panel 4, despite body weaving.

In order to assure proper downward movement of each panel, its lower corner may be provided with a cam element or guide shoe 44 (Fig. 11) which is beveled to correspond to the beveled surface of the corresponding panel edge and which has an inwardly and downwardly curved surface to contact the upper edge of a body wall slot, thus to prevent the catching of the lower corner of the panel upon the bottom wall of such a slot. If desired, the end of such a cam element 44 may be provided with an inwardly directed straight surface 45 to prevent, even under extreme conditions of distortion, the movement of the panel endwise through the corresponding slot 30 or 31.

Preferably the door 1 may be connected to the rear section 2 by hinge means of the character disclosed and claimed in my copending application Serial No. 654,995. For this purpose a lower hinge 50 may be spaced somewhat outwardly of the surface of the body wall, while an upper hinge 51 may be disposed within the outer surface of the wall (Fig. 8). The hinges 50 and 51 cooperate in defining an inclined hinge axis A that intersects the planes of the panels when they are fully raised. Fig. 12 illustrates the general relationship of this axis and the paths of the panels. This arrangement, as shown in Fig. 17, is effective in causing the corner of raised panel 3 to remain juxtaposed to or in light contact with the adjoining surface of raised panel 4 when the door is swung to its fully open position. Obviously the springs 11 permit relative movement between these panels and act as take-up means when the door is open. If the door is opened and the panels are both substantially half raised, they may occupy a position substantially as shown in Fig. 18, wherein the corner of panel 3 is spaced a short distance from the panel 4. Thus, under these conditions, there is but a slight spacing of the glass panels when the door is opened; and when they are at or near their fully raised positions, they remain in close juxtaposition or in contact when the door is opened, this being particularly desirable as the support afforded the panels is obviously less firm as they approach their fully raised position and the influence of the elements 40 and 41 becomes less effective.

When both panels approach their lowest positions, or when panel 3 is not above the position shown in Fig. 15 and panel 4 is substantially lowered, the panel edges remain out of contact, as illustrated, for example, in Figs. 13 and 5, even when the door is closed. Thus it is obvious that there is no shock to the panels when the door is slammed under such conditions. Accordingly an arrangement is provided permitting the continuous close juxtaposition or contact of the panels when they are in or near their fully raised positions under all conditions, even when the door is open. This arrangement permits the panels to contact when they are both substantially half raised, for example, or the panel 4 is raised and the panel 3 is substantially half raised and when the door is closed. Under these conditions the panels are disposed as shown in Fig. 18 when the door is opened, and there is but limited relative movement between the panel edges so that there is but little shock to the glass upon door closing. As the panels leave such a position and both approach their fully lowered positions, they are always maintained out of contact, thus avoiding the necessity of having the panel edges contact upon door closing after moving through a substantially longer distance than that indicated in Fig. 18, as would be necessary with the inclined axis A if the panels were to contact in their lowermost positions.

Fig. 19 illustrates an optional development of the invention wherein the door 101 and rear section 102 may cooperate to afford a closure wall, the door 101 being of the same general type as has previously been described and supporting a panel 103, which may be lifted and lowered in any suitable manner such as that disclosed with reference to panel 3.

The panel 104 may have the general shape indicated in full lines in Fig. 19 and may move from the raised position shown wherein it is overlapped by the panel 103 to the fully lowered position indicated in dot and dash lines. It is evident that in this fully lowered position the panel 104 is disposed so that its lower portion or channel frame 112 is above the curved wheel housing 205. Thus the panel may be disposed over the wheel housing, although movable to a position where it is almost or entirely concealed, and accordingly it is not necessary to reduce the effective width of the seat in order to accommodate a panel movable in this manner.

The panel 104 preferably is supported at the rear by a depending ear 120 which, as shown in Figs. 19 and 23, is provided with a slot 121 engaging a bolt or pin 122 in a box-like support 123. Rubber pads 124 are disposed within the support 123 and carry shims 125 engaging the opposite faces of the ear 120. Thus the slotted connection 121 permits limited longitudinal movement of the panel in relation to the bracket 123 and the rubber elements 124 permit slight relative movement in other directions. The member 123 is secured to an extension of an internally threaded element 126 which is mounted upon a threaded rod or worm 127, this worm being inclined in the general manner shown and having a beveled gear 128 at its upper end meshing with a pinion 129 upon a substantially horizontal lifter shaft 130.

The front end of panel 104 may be supported in the same general manner as described with reference to the embodiment of the invention illustrated in Fig. 1, with the exception that the leaf spring 111 may be inclined downwardly and somewhat rearwardly and may have a pivotal connection at its lower end with a supporting bracket 135, this bracket having a bifurcated portion 136 (Figs. 20 and 21) engaging opposite rubber washers 137 which in turn engage washers 138 at opposite sides of the spring 111. A suitable pivot pin 140 extends through an opening in the spring and through washers 137 and 138 as well as aligned openings in the bifurcated member 136. The member 136 is connected as by welding to a web 142 extending between internally threaded bosses 143 that engage inclined worms 144. The worm 144 upon the inside of the body wall has a gear 146 driven by a pinion 129 at the front end of shaft 130. The shaft 130 may be driven by any suitable means, such as the electrical means disclosed in my copending application Serial No. 690,331 filed September 21, 1933, or in the same manner as described with reference to Fig. 1. Suitable gearing, indicated in general by numeral 150, may be disposed at the lower ends of the worms 144 so that the worm at the outer side of the body wall section may be driven.

The gears 129, 128 and 146 and the worms 144 and 127 may be so related that there is a definite speed ratio between the movement of the brackets supporting the opposite ends of the panel. As shown, the gear 128 has twice the pitch diameter of gear 146, the pinions 129 being of the same size and the worms 127 and 144 having the same pitch and diameter. Accordingly with the exact relationship of the parts as shown by way of example in Fig. 19, the front bracket 135 may move at a speed which is twice as great as that of the rear bracket. Thus a modified rotary movement of the panel is provided; in effect a translation along a substantially curved path is afforded as it moves from its lowermost to its fully raised position.

At the lower portion of its path, the upper corner of the panel 104 projects forwardly of the main portion of the body wall section 102. To accommodate this corner, a projection having an upwardly and forwardly inclined end is afforded at the upper front corner of body wall section 102, such an extension being indicated by numeral 160 (Fig. 25). In addition to the inclined front wall, this extension may have an inner wall 161 with a lateral inclination corresponding to the lateral inclination of the walls 25 and 27 of Figs. 2 and 3, in other words, conforming to the inclination of the bevel upon the panel edge.

The wall 161 may be covered with a rubber element 162 corresponding to the rubber elements 32 and 33 and the corner of the lowered panel 103 may engage this rubber member. A shallow slot or broken away portion 165 may be provided in the upper portion of wall 161 so that the panel 104, when fully raised, may have its lower corner moved over to permit the panels to be in full face to face engagement when the panel 103 is fully lifted.

The door 101, as most clearly shown in Fig. 22, is provided with an inner portion that is recessed to receive the projection 160. This part of the door is provided with a forwardly inclined wall 167 at its upper corner, the edge of this wall being spaced by a suitable slot from the vertical end wall of the door. This slot 168 has a depth of the order of the vertical extent of the extension 160, and the arrangement of the inclined and vertical walls of the door end is such that a triangular portion of the upper corner of panel 101 is exposed and may engage the outer surface of the rubber element 162. Thus the wall 161, with its cover 162, affords an intervening unit corresponding to that described with reference to wall 27 and rubber elements 31 and 32, the panels being pressed against this intervening element as they move toward their fully lifted positions.

As clearly indicated in Fig. 19 the adjoining edge portions of the panels are in spaced overlapped positions even when the interposed unit is thus effective in holding them apart. Thus, for instance, when the panel 104 is in its lowest position, its upper corner overlaps but is spaced from the lower corner of the raised panel 103. As the panel 104 is raised, greater portions of their edge areas are thus brought into overlapping relationship, and the edges of the panels move into contact in the same general manner as illustrated in Figs. 13 to 16, inclusive. Cam elements 244 may be provided on the lower corners of the panels to engage the bottom of the slot 165 to prevent catching of the panels upon this portion of the structure.

The sliding of panel 104 is by translation along a somewhat curved path, this path being dependent upon the paths of the portions of the panel assemblies which engage the worms 144 and 127, respectively.

In laying out the panel movement, portions of the panel assembly may be considered as following substantially straight lines. Thus the pivot opening of spring 111, which is fixedly related to the remainder of panel 104, follows the straight line P, indicated in Fig. 19, the remainder of the panel assembly having a swinging movement about this pivot axis. The corresponding portion of the rear bracket may also follow a straight line, indicated by S in Fig. 19, while the slotted connection provided by parts 120 and 122 is arranged so that the part 120 follows a slightly curved path C, thus permitting the brackets to move along straight paths at a uniform relative speed ratio, i. e., in the embodiment of the invention shown the bracket at the front of the panel moves twice as fast as the bracket at the rear of the panel. Obviously the relative positions and angles of the worms may be considerably changed as desired and as determined by the position of the wheel housing.

Obviously the rear connection provided by the ear 120 and bracket 123 may be a simple pivotal connection, while, as shown in Fig. 29, the front bracket 135a may be provided with a slot 135b to engage the pivot pin 140a extending from spring 111a.

If desired, the wall of the extension 160 of the rear section 102 may be broken away, i. e., the wall 161, to provide a triangular opening similar to that on the door so that the panels may contact throughout their paths. Fig. 30 illustrates such an arrangement, the panels and door sections otherwise being indicated by reference numerals similar to those employed in Fig. 22 and the opening upon the inner side of the extension 160 being indicated by numeral 169.

The guiding and supporting mechanism employed by the front panel with both embodiments of the invention, as illustrated in Fig. 1, is advantageous in providing an assembly of shafts and connecting means that is substantially rectangular or of inverted U-shape, the shaft 14 on the inside of the door and the shafts 5 requiring a greater door thickness than would otherwise be necessary. In order to permit the maximum seat width, a portion of the inner wall of the door may be dished inwardly, as indicated by numeral 200, this dished portion being adjoining the seat and being shown particularly in Figs. 26, 27 and 28. A yieldable fabric covering 203 for the door may extend across this dished portion and a body of readily yieldable material 204 may be disposed in the dished portion and concealed by the covering 203. Preferably sponge rubber may be used for this purpose. Thus the door will have an inner surface of substantially conventional appearance, but when maximum seat room is desired, the fabric 203 will stretch and the sponge rubber 204 will be compressed so that the effective width of the seat is substantially increased.

The arrangement illustrated in Fig. 19 may be employed in a rear door rather than in a fixed body wall section if desired, such an arrangement being particularly advantageous in a door which is undercut to clear the rear mud guard. Obviously the arrangement of Fig. 19 may be employed when the panel edges are either arranged to follow paths which converge or when the panels remain in contact with each other or when the panels remain in spaced substantially overlapped relationship.

I claim:

1. A vehicle body comprising a body wall having adjoining sections with pockets therein, one of said pockets having an end wall separating it from the adjoining pocket, panels carried by the body wall and movable upwardly out of the respective pockets to a raised position thereabove, wherein the panels are in direct edge to edge juxtaposition, and lifting and guiding means for said panels arranged to press their edges against said end wall as the panels move upwardly.

2. A vehicle body comprising a body wall having adjoining sections with pockets therein, one of said pockets having an end wall separating it from the adjoining pocket, panels carried by the body wall and movable upwardly out of the respective pockets to a raised position thereabove, wherein the panels are in direct edge to edge juxtaposition, and lifting and guiding means for said panels arranged to press their edges against said end wall as the panels move upwardly, said means and end wall being arranged so that the panels are separated when they are fully lowered and so that their paths incline toward each other to permit their edges to meet as they move toward their raised positions.

3. A vehicle body comprising a body wall having a swinging door section and an adjoining section, said sections being hollow to provide pockets, both of said sections having end walls, the end walls being broken away to provide openings extending downwardly from the top of the body wall, a pair of panels carried by the respective body wall sections and movable upwardly out of the pockets to a raised position wherein the panels have edges in direct juxtaposition, said openings extending downwardly for a fraction of the height of the panels when the latter are lowered, one of said openings extending below the other opening, the panel corresponding to the deeper opening having a portion extending through the same to engage the end wall of the adjoining wall section below its opening, supporting means for said panel yieldably pressing the panel against said end wall, the panel being arranged to move upwardly over said opening and out of engagement with said end wall when in its fully raised position.

4. A vehicle body comprising a body wall including a swinging door section and an adjoining section, each of said sections having a pocket, the end of one of said pockets being broken away to provide an opening, panels carried by the respective sections, the panel carried by the section with said opening being adapted to extend through said opening and engage the end wall of the adjoining section, supporting means for said panel yieldably pressing it against said end wall, and lifting and guiding means for both of said panels arranged to cause the panels to move upwardly into direct edge to edge juxtaposition.

5. A vehicle body comprising a body wall including a swinging door section and an adjoining section, each of said sections having a pocket, the end of one of said sections being broken away to provide an opening, panels carried by the respective sections, the panel carried by the section with said opening being adapted to extend through said opening and engage the end wall of the adjoining section, supporting means for said panel yieldably pressing it against said end wall, said end of the section which is engaged by the panel being provided with an opening of less height than the first-named opening, the panels being arranged to move upwardly so that their lower edges meet above said openings when they are fully raised, and lifting and guiding means for both of said panels arranged to cause the panels to move upwardly into direct edge to edge juxtaposition.

6. A vehicle body comprising a body wall including a swinging door section and a fixed section, a panel carried by the door section, lifting and guiding means directing said panel upwardly along a substantially vertical path, a panel carried by the fixed section, and lifting and guiding means directing said panel upwardly in a generally forwardly inclined direction, the fixed section having an inclined extension projecting from its end wall to receive the edge of its panel and the door section having a recess to receive said extension, the door being provided with an opening at the side of said recess, said opening permitting the panel carried by the door to engage the surface of said extension as the door panel rises toward its lifted position.

7. A vehicle body comprising a body wall including a door section and an adjoining section, a panel movable upwardly along a substantially vertical path carried by the door section, a panel movable upwardly in a generally longitudinally inclined path carried by the adjoining section, lifting and guiding means for said last-named panel comprising a pair of worm elements pivotally connected to opposite end portions of the panel and disposed in angular relation to each other, and driving means to cause the operation of said worms in synchronized relationship.

8. A vehicle body comprising a body wall including a door section and an adjoining section, a panel movable upwardly along a substantially vertical path carried by the door section, a panel movable upwardly in a generally longitudinally inclined path carried by the adjoining section, lifting and guiding means for the panel carried by said adjoining section, said means including a pair of inclined worms, both having an inclination toward the door section, the worm further from said section having a greater inclination than the worm nearer said section, a pivotal connection between one of said worms and the adjoining portion of the panel, and a connection permitting relative pivotal and sliding movement between the other worm and the adjoining portion of the panel.

9. A vehicle body comprising a body wall including a door section and an adjoining section, hinge means connecting said sections and arranged to define an inclined hinge axis, panels carried by the respective sections and movable out of concealed positions therein to raised positions thereabove where the panel edges are juxtaposed, the body wall affording an intervening unit against which the panel edges are held as they move out of their concealed positions toward their raised positions, the hinge axis intersecting the general plane of the panels when they are raised so that little relative movement occurs between the upper parts of the raised panels when the door is open, the intervening part being effective in holding the panels apart when they are near their lowered positions.

10. A vehicle body comprising a hollow body wall, panels movable upwardly out of said wall to a raised position thereabove, supporting and guiding means for said panels associated with said wall, an intervening unit included in said wall between the edges of the lowered panels, said means pressing the edges of the panels against said unit as they move out of their lowered positions, the paths of the panels converging as they approach their fully raised positions, so that the panel edges are in direct face to face engagement when the panels are fully raised, and cam means arranged to permit the downward movement of the panels past the upper end of the intervening unit.

11. A vehicle body comprising a hollow body wall, panels carried by said wall and movable out of the same to a raised position thereabove, wherein the edges of the panels are in direct face to face engagement, lifting and guiding means for said panels arranged to direct the panels upwardly so that their adjoining edges follow substantially transversely converging paths while constraining them against relative longitudinal movement.

12. A vehicle body comprising a body wall, a panel carried by the body wall and movable out of the same to a raised position thereabove, lifting and guiding means for said panel arranged to direct it along a substantially curved path, said means comprising supports adjoining opposite ends of the panels, operative elements engaging said supports and moving them along substantially straight lines but at different speeds, and means for driving said elements at a uniform speed ratio.

13. A vehicle body comprising a body wall including a front section and a rear section, a wheel housing adjoining the rear section, panels carried by said sections, the panel carried by the rear section being movable out of a substantially concealed position wherein its lower edge is above the wheel housing to a raised position wherein its edge is juxtaposed to the rear edge of the raised front panel, and lifting and guiding means within said rear section arranged to direct the panel from its concealed to its fully raised position, said means including spaced guides for the front and rear portions respectively of said panel.

14. A vehicle body comprising a body wall including two sections, adjoining ends of the sections having oppositely disposed complementary rabbeted portions, and closure panels movable upwardly in the respective sections and having ends in said rabbeted portions so that the panels may have their ends in substantially spaced overlapped relationship, the adjoining walls of the rabbets having upper portions broken away so that the lower corners of the panels may move into contact when the panels are near their fully raised positions.

15. A vehicle body wall comprising two sections with adjoining rabbeted ends, the rabbeted end portions of the sections being oppositely and complementarily disposed, and having longitudinally extending, somewhat laterally inclined walls, closure panels movable upwardly in the respective sections and having ends in the rabbeted portions of the sections, the panels having substantially parallel beveled faces, the lateral inclination of said walls of the rabbeted portions corresponding to the angle of the beveled panel ends.

16. A vehicle body comprising a body wall having adjoining sections, the upper corner of one of said sections having a rabbeted portion with its front edge inclining upwardly and forwardly, the adjoining section normally concealing said rabbeted portion, closure panels carried by the respective sections, the panel carried by the section with the rabbeted end portion having a corner following an inclined path as it moves out of a lowered position to a fully raised position.

17. Vehicle body comprising a body wall having adjoining sections, panels movable upwardly out of the respective sections into a position wherein their adjoining edges extend in the same general direction and are juxtaposed, one of said panels following a generally inclined path but having a portion of its edge in generally overlapping relation with the edge of the adjoining panel throughout its path.

18. In a vehicle body, the combination with a pillar, of a frame located adjacent said pillar, and a window slidable in an upwardly directed path having a transverse component within said frame from a position transversely alongside said pillar into a position in which a portion of the window is disposed above and over a portion of the pillar.

19. In a vehicle body, the combination with a pair of adjacent windows, of a frame for supporting said windows for movement to raised and lowered positions, said frame including an intermediate structural member interposed between transversely spaced edges of said windows in the lowered position of the latter, and means for guiding said windows for sliding movement in transverse upwardly converging paths to cause the windows to substantially abut in the raised position.

20. A vehicle body comprising a hollow body wall, panels movable upwardly out of said wall to a raised position thereabove, supporting and guiding means for said panels associated with said wall, an intervening unit included in said wall between the edges of the lowered panels, said means pressing the edges of the panels transversely against said unit as they move out of their lowered positions and directing their edges transversely into direct juxtaposition when the panels are within the upper parts of their paths.

21. A vehicle body comprising a hollow body wall, panels movable upwardly out of said wall to a raised position thereabove, supporting and guiding means for said panels, a structural portion of the wall being disposed between the lowered panels, said means constraining the panels against movement longitudinally of the wall and being effective to impart a relatively transverse movement to the panel edges as the panels move upwardly, so that the edges of the raised panels are brought into direct face-to-face juxtaposition.

22. A vehicle body comprising a wheel housing, a hollow body wall section having a rear part over said housing, a window panel carried by said section, supporting and guiding means for said window effective to direct the window along a slightly curved generally vertical path, so that the lower edge of the raised panel may extend at an acute angle to the direction of extent of the same edge when the panel is lowered, said panel having an upper edge curving downwardly to meet the rear end of its lower edge, so that the rear part of the panel-receiving space over the wheel housing may have less depth than the front portion thereof.

23. A vehicle body comprising a hollow body wall section, a window panel carried by said section, supporting and guiding means for said window effective to cause the panel movement by translation along a curved path, said means including mutually inclined straight guides.

24. A vehicle body comprising a hollow body wall section, a window panel carried by said section, supporting and guiding means for said window effective to cause the panel movement by translation along a curved path, said panel having a substantially horizontal lower edge, said means including a pair of straight guides inclined relatively to each other and to said edge of the panel.

25. A vehicle body comprising a hollow body wall section, a window panel carried by said section, supporting and guiding means for said window effective to cause the panel movement by translation along a curved path, said panel having a substantially horizontal lower edge, said means including a pair of straight guides inclined relatively to each other and to said edge of the panel, and parts pivotally connected to said panel and movable along said guides.

26. A vehicle body comprising a hollow body wall section, a window panel carried by said section, supporting and guiding means for said window effective to cause the panel movement by translation along a curved path, said panel having a substantially horizontal lower edge, said means including a pair of straight guides inclined relatively to each other and to said edge of the panel, parts movable along the respective guides, and pivot means defining substantially parallel pivot axes extending transversely of the wall, said pivot means connecting said parts to the panel.

RAYMOND L. CARR.